US012591775B1

(12) United States Patent
Sar Shalom et al.

(10) Patent No.: US 12,591,775 B1
(45) Date of Patent: Mar. 31, 2026

(54) MULTI-TASK TRAINING PROCESS BASED ON COLLABORATIVE DATA

(71) Applicant: Meta Platforms, Inc., Menlo Park, CA (US)

(72) Inventors: Oren Sar Shalom, Nes Ziona (IL); Yaakov Bibas, Modi'in-Maccabim-Re'ut (IL)

(73) Assignee: Meta Platforms, Inc., Menlo Park, CA (US)

( * ) Notice: Subject to any disclaimer, the term of this patent is extended or adjusted under 35 U.S.C. 154(b) by 859 days.

(21) Appl. No.: 17/816,036

(22) Filed: Jul. 29, 2022

(51) Int. Cl.
*G06N 3/08* (2023.01)
*G06F 18/22* (2023.01)
*G06F 18/2431* (2023.01)

(52) U.S. Cl.
CPC ............... *G06N 3/08* (2013.01); *G06F 18/22* (2023.01); *G06F 18/2431* (2023.01)

(58) Field of Classification Search
CPC ...................................................... G06N 3/08
USPC ........................................................... 706/15
See application file for complete search history.

(56) References Cited

U.S. PATENT DOCUMENTS

| | | | |
|---|---|---|---|
| 2021/0192220 A1 | 6/2021 | Qu et al. | |
| 2022/0012022 A1* | 1/2022 | Schwartz | ............... G06N 3/082 |
| 2022/0342945 A1* | 10/2022 | Dagar | .................... G06N 20/00 |
| 2023/0196435 A1* | 6/2023 | Chaturvedi | .............. G06N 3/08 |
| | | | 705/26.7 |

FOREIGN PATENT DOCUMENTS

| | | |
|---|---|---|
| CN | 108647691 B | 7/2020 |
| CN | 108664986 B | 9/2020 |
| CN | 113033626 A | 6/2021 |

OTHER PUBLICATIONS

Li S., et al., "Deep Collaborative Filtering Incorporating Auxiliary Multi-Media Information," 2018 IEEE SmartWorld, downloaded Mar. 1, 2022, 8 pages.

* cited by examiner

*Primary Examiner* — Hung T Vy
(74) *Attorney, Agent, or Firm* — EVERSHEDS SUTHERLAND (US) LLP

(57) ABSTRACT

Systems, apparatuses and methods provide technology that generates an interaction matrix from collaboration data, where the collaboration data represents user interactions with a plurality of items. The technology applies a matrix factorization process to the interaction matrix to generate user vectors and matrix item vectors, and executes a multi-task training process with a neural network. The multi-task training process includes processing the collaboration data with the neural network to generate latent item vectors, and training the neural network based on a comparison of the latent item vectors to the matrix item vectors.

17 Claims, 9 Drawing Sheets

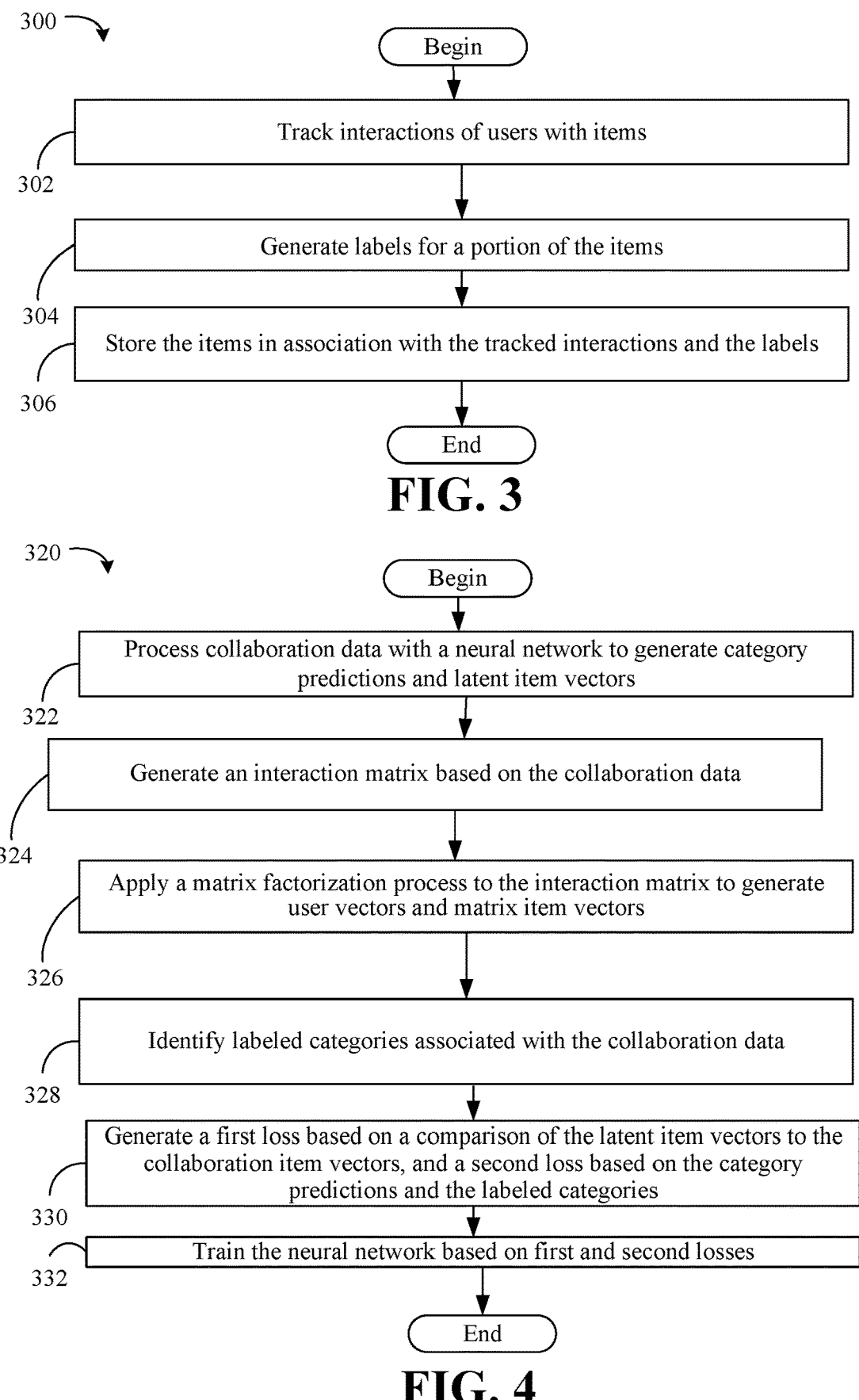

300

Begin

Track interactions of users with items

302

Generate labels for a portion of the items

304

Store the items in association with the tracked interactions and the labels

306

End

Begin

Process collaboration data with a neural network to generate category predictions and latent item vectors

322

Generate an interaction matrix based on the collaboration data

324

Apply a matrix factorization process to the interaction matrix to generate user vectors and matrix item vectors

326

Identify labeled categories associated with the collaboration data

328

Generate a first loss based on a comparison of the latent item vectors to the collaboration item vectors, and a second loss based on the category predictions and the labeled categories

330

Train the neural network based on first and second losses

332

End

FIG. 4

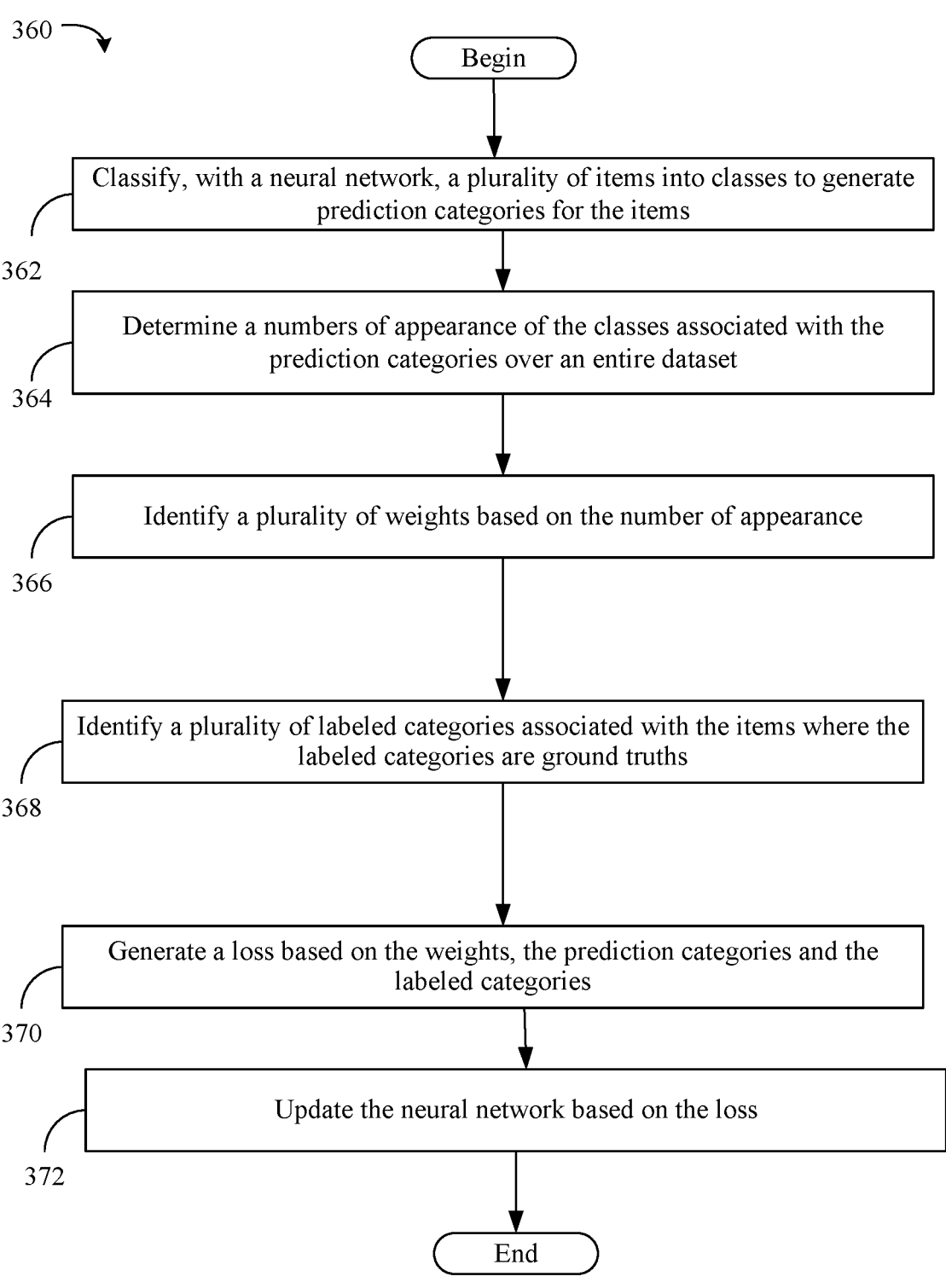

360

Begin

Classify, with a neural network, a plurality of items into classes to generate prediction categories for the items

362

Determine a numbers of appearance of the classes associated with the prediction categories over an entire dataset

364

Identify a plurality of weights based on the number of appearance

366

Identify a plurality of labeled categories associated with the items where the labeled categories are ground truths

368

Generate a loss based on the weights, the prediction categories and the labeled categories

370

Update the neural network based on the loss

372

End

FIG. 5

MULTI-TASK TRAINING PROCESS BASED ON COLLABORATIVE DATA

TECHNICAL FIELD

Embodiments generally relate to artificial intelligence (AI) and/or machine learning based on collaborative data generated based on user interactions with items. More specifically, embodiments relate to systems, apparatuses and methods for training a neural network through a multi-task learning process that is based on the collaborative data, and an inference process with the trained neural network.

BACKGROUND

Item (e.g., images, voice, web searching, fraud detection, etc.) understanding is a process of automatically analyzing unstructured item data in order to extract knowledge for specific tasks. For example, automatically assigning images to predefined categories (i.e., image categorization) is an important form of image understanding and an area which has experienced substantial progress in recent years, largely due to innovations in deep learning. Training neural networks to classify items may be problematic as generating curated datasets (e.g., hand-labeled data) is time-consuming, prone to error and costly.

SUMMARY

Some embodiments relate to at least one computer readable storage medium comprising a set of instructions, which when executed by a computing device, cause the computing device to generate an interaction matrix from collaboration data, where the collaboration data represents user interactions with a plurality of items, apply a matrix factorization process to the interaction matrix to generate user vectors and matrix item vectors, and execute a multi-task training process with a neural network. The multi-task training process includes processing the collaboration data with the neural network to generate latent item vectors, and training the neural network based on a comparison of the latent item vectors to the matrix item vectors.

Some embodiments relate to a system comprising one or more processors, and a memory coupled to the one or more processors. The memory comprises instructions executable by the one or more processors, the one or more processors being operable when executing the instructions to generate an interaction matrix from collaboration data, where the collaboration data represents user interactions with a plurality of items, apply a matrix factorization process to the interaction matrix to generate user vectors and matrix item vectors, and execute a multi-task training process with a neural network. The multi-task training process includes processing the collaboration data with the neural network to generate latent item vectors, and training the neural network based on a comparison of the latent item vectors to the matrix item vectors.

Some embodiments relate to a method comprising generating an interaction matrix from collaboration data, wherein the collaboration data represents user interactions with a plurality of items, applying a matrix factorization process to the interaction matrix to generate user vectors and matrix item vectors, and executing a multi-task training process with a neural network. The multi-task training process includes processing the collaboration data with the neural network to generate latent item vectors, and training the neural network based on a comparison of the latent item vectors to the matrix item vectors.

BRIEF DESCRIPTION OF THE DRAWINGS

The various advantages of the embodiments will become apparent to one skilled in the art by reading the following specification and appended claims, and by referencing the following drawings, in which:

FIG. 3 is a flowchart of an example of a method of generating a collaborative dataset to train a neural network in a multi-task training process according to an embodiment;

FIG. 4 is a flowchart of an example of a method of training a neural network in a multi-task training process according to an embodiment;

FIG. 5 is a flowchart of an example of a method of generating a loss based on weights, prediction categories and labeled categories, and updating a neural network based on the loss according to an embodiment;

DESCRIPTION OF EMBODIMENTS

Embodiments relate to an enhanced classification system that is able to categorize and label items due to an efficient and focused multi-task training process based on a rich collaborative dataset. The multi-task training process leverages item representations that encode information about relevant categories in a domain. For example, hosting entities (e.g., providers of e-commerce, social media sites, etc. that host items online) have access to collaborative data that is collected during interactions with items. The collaborative data includes a recordation of how users interact with the item (e.g., online content) in the form of viewing, rating, commenting, tagging, resharing, etc. Embodiments train a neural network based on the collaborative data to facilitate collaborative item understanding. Specifically, embodiments train a neural network in a multi-task fashion based on a labeled dataset and the collaborative data (e.g., collaboratively obtained information). The collaborative data serves as an additional input for the training phase of item understanding models (e.g., machine learning models such as neural networks) in addition to the labeled dataset. By incorporating the collaborative data during training (e.g., only during training) neural networks may effectively classify data. Embodiments thus support inference operations such as classification of new items for which collaborative data is not available (e.g., in a situation where the items are uploaded and available to users but lack any collaboration information or significant user interaction).

Embodiments herein include several enhancements. For example, embodiments introduce a new signal (i.e., collaborative information/data) to be utilized during training and to support the training procedure of automated item understanding processes. Embodiments further include a general multitask-learning (MTL) framework to incorporate the collaborative data (which may be in the form of latent item representations) into a neural network (e.g., a single-task content understanding model). Embodiments may further include several alternative approaches to combining collaborative information in the training process of a neural network (e.g., an item classification model). Embodiments effectively train the neural network in typical real-world situations when labels are missing for a portion of the training images.

Figure 1:
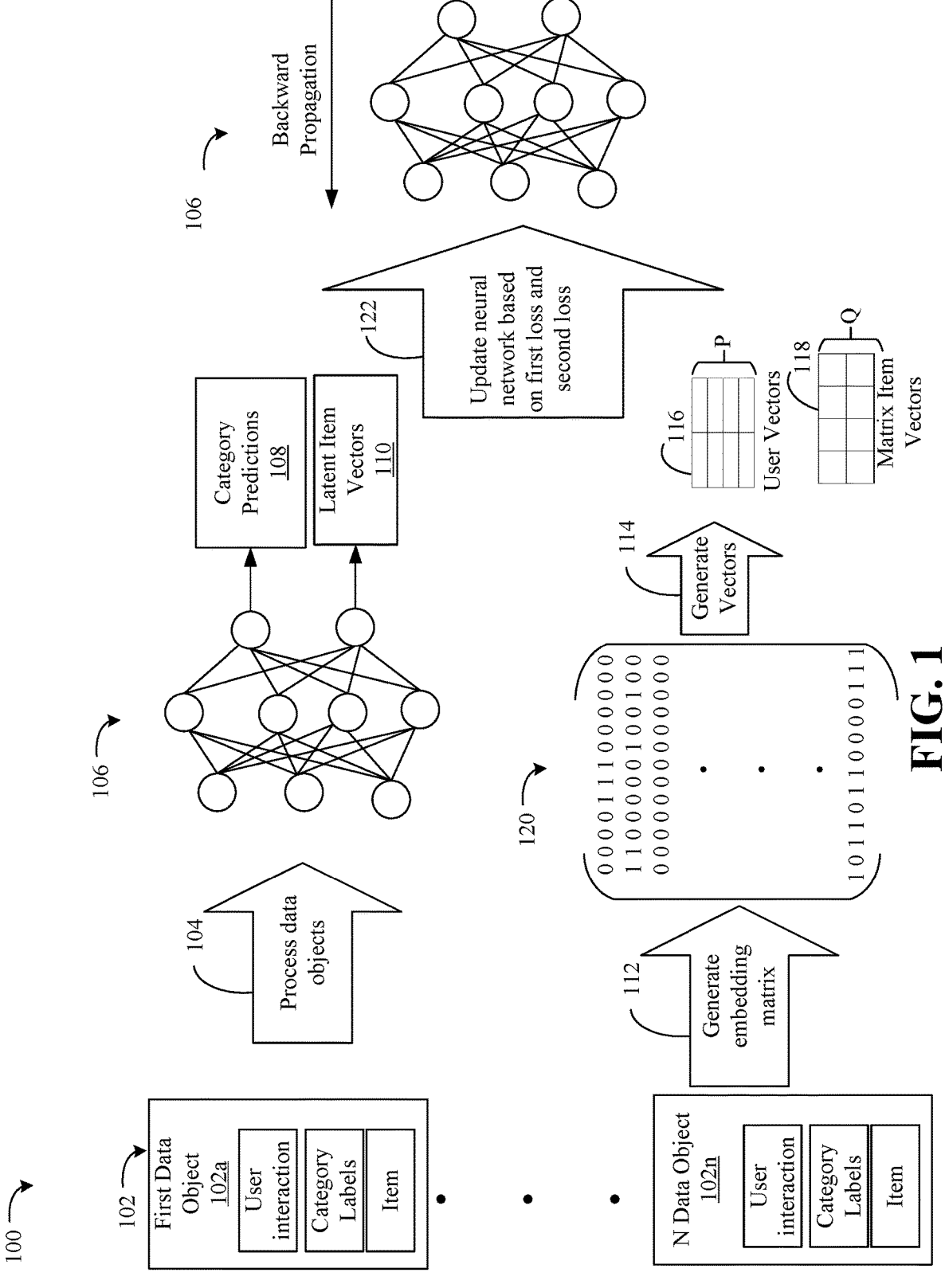
FIG. 1 is a process of an example of a multi-task neural network training process according to an embodiment.

Turning now to FIG. 1, a multi-task neural network training process 100 is illustrated. The multi-task neural network training process 100 executes based on data objects 102. In particular, a data repository may include first data object 102a-N data object 102n. As an input to the multi-task neural network training process 100, embodiments obtain a collection of data objects 102 that each include an item. Each of the data objects 102 includes an item, category labels assigned to the item, and recordation of user interactions with the item by a set of users (e.g., through rating, tagging, or sharing, etc.). Thus, each data object of the data objects 102 comprises an item, category labels associated with the item and user interactions with the item. As illustrated, the multi-task neural network training process 100 processes the data objects 102 in two different ways: 1) with a matrix based process, and 2) with the neural network 106.

In detail, the matrix based process generates a raw usage matrix 120, 112. The raw usage matrix 120 contains recorded interactions between users and items of the data objects 102. For example, the user interactions with the data objects 102 may store the recorded interactions, which are converted into a binary format and combined into the raw usage matrix 120. The raw usage matrix 120 may thus summarize the data objects 102 (e.g., user interactions such as a number of users that interact with an item, category label, etc.) in a binary format. To generate the raw usage matrix 120, embodiments may first log the user-item interactions. Each interaction holds the identification (id) of a respective user and the item. Additional data may include context (e.g., event time) and side-information (e.g., textual description of the item). Embodiments may then train a collaborative filtering (CF) method that generates the raw usage matrix 120. Each row in the raw usage matrix 120 holds a distributed representation (i.e., vector) of an item. In some embodiments, items that have no interactions with users are bypassed and not included in the raw usage matrix 120 and therefore may not contribute to the multi-task learning approach.

The raw usage matrix 120 may then be processed to generate vectors 114. In detail, a matrix factorization (MF) technique may be applied to the raw usage matrix 120 to generate the vectors 114, to represent users and items (e.g., user-item interactions) in a lower-dimensional latent space. MF processes the raw interactions data and generates the lower dimensional latent representations of the users and items. These vectors constitute the raw usage matrix 120. For example, MF techniques project users and items into a shared latent space, where each user and each item is represented through a real-valued vector. In this example, the process 100 generates fixed-size latent representations of user and items respectively referred to as user vectors 116 (which are stored in a first embedding matrix) and matrix item vectors 118 (which are stored in a second embedding matrix) based on the raw usage matrix 120. Embedding may mean a dense representation of an entity. Each of the user vectors 116 indicates to what extent the corresponding user prefers latent traits which may be represented by a list of floating point numbers. Similarly, matrix item vectors 118 represents to what extent corresponding items possesses the latent traits. Latent traits may be latent because the meaning of the traits is unknown, but it may be inferred that latent factor models are highly effective for recommendations and training. Such latent traits may be used during the process 100 to train the neural network 106.

Therefore, MF techniques are used to construct user vectors 116 embodied as a user raw usage matrix P, and matrix item vectors 118 embodied as an item raw usage matrix Q of a given size f (number of factors). The raw usage matrix 120 (e.g., an original matrix M) is approximated by the operation $PQ^T$. Each item i has a corresponding matrix item vector $q_i$ (which may be referred to as a CF vector).

The process 100 further includes a multitask learning approach with the neural network 106. During the multitask learning approach, a main task of the neural network 106 may be to predict the categories (e.g., category labels) of the items, and the auxiliary task is to "reconstruct" the latent item representations of the matrix item vectors 118. As mentioned, embodiments assume that the matrix item vectors 118 (which may also be referred to as CF vectors) encode category information that may facilitate the training of a main task (e.g., category labelling). That is, the latent representations represented in the matrix item vectors 118, and which are derived from collaborative data, may not be directly interpretable, but the item representations encode some information about the relevant categories in a domain.

As used herein, $i \in \{1, \ldots, l\}$ may index items. Table 1 summarizes the notations utilized herein:

TABLE 1

| Main symbols | |
| --- | --- |
| Symbol | Explanation |
| $x_i$ | Content of item i |
| $y_i$ | Category label of item i (a binary vector) |
| $\hat{y}_i$ | A predicted label of item i (a real-valued vector) |
| $U_i$ | Set of users who interacted with item i |
| $q_i$ | CF vector of item i |
| $\hat{q}_i$ | A predicted CF vector of item i |
| $\omega_i$ | Weight of CF vector of item i |

During training, each item i is associated with an image xi and with a category (e.g., label) $y_i$ which is analogous to a category. Furthermore, the item i may be associated with a set $U_i$ of users who interacted with the item i. At inference time, items to be processed by the neural network 106 do not have any associated historical interaction data. Such a lack of historical data does not impede inference since the neural network 106 is trained to identify new items.

Predicting the labels (e.g., categories) may be the main task of the neural network 106, and the auxiliary task of the neural network 106 is generating the latent item vectors 110.

In order to generate the category predictions 108 and latent item vectors 110, the neural network 106 processes data objects 102, 104.

The input to the neural network 106 is a set of triplets $\{(x_i, y_i, q_i)\}$, where $x_i$ is an item, $y_i$ is the label of the item $x_i$, and $q_i$ is a latent item vector (e.g., a CF vector) that is generated based on collaboration data associated with the item $x_i$. For example, $q_i$ may be extracted from the matrix item vectors 118 based on the item $x_i$. The set of triplets are used to generate the loss of the neural network (explained below further). The neural network 106 has two outputs, corresponding to the main and auxiliary tasks, which in this example are category predictions 108 (i.e., $\hat{y}_i$) and latent item vectors 110 (i.e., $\hat{q}_i$), respectively. As explained below, the category predictions 108 are compared to the labels (e.g., $y_i$) of the category labels of the data objects 102, and the latent item vectors 110 are compared to the matrix item vectors 118 (e.g., $q_i$). The neural network 106 may classify the plurality of items into classes to generate category prediction predictions 108 for the items.

For example, if the neural network 106 is operating accurately, the latent item vectors 110 will match the matrix item vectors 118 (e.g., CF vectors or $q_i$). If the neural network 106 is operating inaccurately, the latent item vectors 110 will not match the matrix item vectors 118. As a more detailed example, each respective latent item vector of the latent item vectors 110 is compared to a corresponding matrix item vector of the matrix item vectors 118. That is, the respective latent item vector and the corresponding matrix item vector are associated with the same data object of the data objects 102 and/or item of the items. For example, the neural network 106 may generate the respective latent item vector based on side-information (aka "content"), like image of the item, and the corresponding matrix item vector may be generated based on the user interaction associated with the same item. Thus, a first loss (referred to as CAUX) is generated based on a comparison of the latent item vectors 110 to the matrix item vectors 118. The user vectors 116 may not be utilized during training.

A second loss (e.g., $\ell_{MAIN}$) may be generated based on the category predictions 108 (e.g., labels) and the category labels of the data objects 102. The category predictions 108 are compared to the category labels of the data objects 102 to determine whether the category predictions 108 are accurate. For example, each respective category prediction of the category predictions 108 is compared to a corresponding category label(s) of the data objects 102. The respective category prediction and the corresponding label(s) are associated with the same item. For example, the neural network 106 may generate the respective category prediction based on the item, and the corresponding label(s) may be stored in association with the same item in an object of the data objects 102. The second loss is generated based on the accuracy of the category predictions 108.

A hyperparameter tuning strategy may be employed to update the neural network 106 based on the first loss and the second loss 122. A final loss function may be is shown in Equation 1:

$$\ell_{MTL}(\hat{y}, y, \hat{q}, q, \omega) = \ell_{MAIN}(\hat{y}, y) + \alpha \cdot \ell_{AUX}(\hat{q}, q, \Omega) \qquad \text{Equation 1}$$

In Equation 1, the first loss is CAUX, and the second loss is $\ell_{MAIN}$. In Equation 1, $\alpha$ is a hyperparameter that controls the relative importance of the two tasks (i.e., category predicting and item vector generation). In some embodiments, the weight of the auxiliary task (i.e., item vector generation) may be deemed non-negligible ($1 < \alpha < 2$), which clearly demonstrates the importance of the auxiliary task.

The neural network 106 may update weights, biases, etc. based on the final loss function (i.e., $\ell_{MTL}$) of Equation 1. The neural network may execute backward propagation based on the final loss, which as noted above is based on losses associated with both the latent item vectors 110 and the category predictions 108.

The second loss may be set based on the following. For classification problems with N classes, the label y is an N-dimensional binary vector that may support multi-label classification. For example, $y^n$ denotes the nth entry in the vector. The single-task categorization model processes the input and outputs a prediction vector $\hat{y}$ that aims to minimize the binary cross-entropy which corresponds to the second loss. Since labels may be imbalanced (e.g., some categories may appear much more than others), embodiments employ a apply class balancing operation as follows. Let $\eta_n$ denote the number of appearances of class n (e.g., determines a number of appearances of the classes associated with prediction categories). The raw weight of such a class is given by $1/n_n$. Embodiments normalize the weights (e.g., identify a plurality of weights based on the number of appearances) such that the average weight is 1, as given by Equation 2 below:

$$1 = \frac{1}{N}\sum_{n=1}^{n}\frac{1}{n_n} \qquad \text{Equation 2}$$

The class-balanced binary cross-entropy (the second loss) is defined as follows in Equation 3:

$$\ell_{main}(\hat{y}^n, y) = \sum_{n=1}^{N}\frac{1}{n_n}y^n * \log \hat{y}^n + (1 - y^n) * \log(1 - \hat{y}^n) \qquad \text{Equation 3}$$

Thus, the second loss may be set based on the classes and according to Equation 3.

The first loss (i.e., CAUX) may be set based on information embedded in the latent item vectors 110, which is to reconstruct the matrix item vectors 118 using the content only. For example, embodiments may calculate a first distance $L_1$ and a second distance $L_2$ that denote the Manhattan and Euclidean distances between a matrix item vector q of the matrix item vectors 118 and a reconstruction vector $\hat{q}$ of the latent item vectors 110, respectively. The matrix item vector q and the reconstruction vector $\hat{q}$ may correspond to a same item. The reconstruction loss (denoted as $l_{CF\_R}$) seeks to minimize the difference between the matrix item vector q and the reconstruction vector q as follows:

$$\ell_{CF\_R}(q_i, \hat{q}_i) = \exp(L_1(q_i, \hat{q}_i) + L_2(q_i, \hat{q}_i)) \qquad \text{Equation 4}$$

In some embodiments, the reconstruction loss $\ell_{CF\_R}$ is utilized to obtain the first loss. Since collaborative filtering methods do not converge to a global optimum, some items might be poorly represented and therefore the collaborative filtering vectors induce weak supervision. That is, there may be "noisy labels," where some collaborative filtering vectors, such as matrix item vectors 118 and/or latent item vectors 110, might be more informative than others. Therefore, some embodiments further include a per-instance confidence weighting adjustment (e.g., a first adjustment) which affects the impact of the auxiliary task. The weighting adjustments may depend on a matrix item vector q and/or on the data objects 102 (which may be referred to as raw collaborative information U), annotated as $h(\cdot) = \omega$. To avoid shattering gradients, w is upper bounded by a hyperparameter $\Omega$. The first loss (i.e., $\ell_{AUX}$) may then be provided by Equation 5:

$$\ell_{AUX}(q\hat{\,},q,\omega)=\min(\omega,\Omega)\cdot\ell_{CF\_R}(q,q\hat{\,}) \qquad \text{Equation 5}$$

A second adjustment to weighting the latent item vectors 110 and matrix item vectors 118 is now provided. The second adjustment is a uniform confidence approach that ignores the possible variability in the fitness and information encoded in the latent item vectors 110 and matrix item vectors 118. Based on this reasoning, a function h may be a nullary function which assigns the same weight to each of the latent item vectors 110 and matrix item vectors 118.

A third adjustment to weighting the latent item vectors 110 and matrix item vectors 118 is now provided. The third approach is an interaction confidence approach. As more users interact with an item, there may be more collaborative information about the item. As a consequence, embodiments place greater value (weight) on CF vectors from the latent item vectors 110 and matrix item vectors 118 that are associated with the item. Based on as much, embodiments set a positive correlation between the assigned weight of a CF vector associated with an item, and a number of user that interacted with the item as recorded in the user interaction field associated with the item. Let $|Ui|$ denote the number of interacting users with item i. Then $h(Ui)=\sqrt{|Ui|}$ which may correspond to a weight for a distance between the CF vectors. For example, $\ell_{AUX}$ may be adjusted based on $\sqrt{|Ui|}$ (e.g., $\ell_{AUX\_updated}=*\ell_{AUX}*\sqrt{|Ui|}$) to increase in value proportionally when the number of users increases, and decrease proportionally when the number of users decrease. Thus, the loss increases as $h(U_i)$ increases.

A fourth adjustment to weighting loss (i.e., the first loss) of the latent item vectors 110 and matrix item vectors 118 is now provided. The fourth approach is a loss-based confidence approach. The utility of a CF vector(s) from the latent item vectors 110 and matrix item vectors 118 for the category prediction task might not always be proportional to an amount of interacting users that interacted with an item associated the CF vector. Embodiments therefore include a weighting process that explicitly captures the utility level of each individual CF vector according to intrinsic traits.

In detail, a category prediction model (may be referred to as CF2Label) may be trained. The category prediction model receives as an input only the CF vector (without the item or image associated with the CF vector). Embodiments then approximate the fitness of a CF vector by its ability to predict the labels, measured by a mean reciprocal loss value on the positive labels (e.g., generate a metric that is a measurement of an ability of a latent item vector to accurately predict a correct label). In this example suppose that y is the actual label of a given item and $\hat{y}$ is the predicted label, then CF 2Label $(q)=\hat{y}$. The mean loss on the positive labels is:

$$\ell_{weight}(\hat{y}^n, y) = \frac{1}{n}\sum_{n=1}^{N} y^n * \log \hat{y}^n + (1 - y^n) * \log(1 - y^n) \qquad \text{Equation 6}$$

Hence, the weight of this CF vector is provided by Equation 7 below:

$$h(q_i, y_i) = \frac{1}{\ell_{weight}(CF2Label(q_i), y_i)} \qquad \text{Equation 7}$$

The fourth adjustment show considerable contributions to increasing the performance of the neural network 106. The corresponding loss based on the CF vector may be weighted by $h(q_i, y_i)$ above (e.g., adjusting the loss based on the metric).

In some embodiments, only a portion of the data objects 102 are labelled and/or contain category labels, for efficiency and reduce overhead. Doing so does not deteriorate performance or training. Thus, some embodiments may be trained effectively over unlabeled data.

After training, the neural network 106 may execute inference tasks on previously unknown items. Thus, the neural network 106 may be trained with reduced overhead, management and lower latency based on the above to accurately execute inference tasks.

Process 100 may be implemented in a computing device, computing system (e.g., hardware, configurable logic, fixed-function logic hardware, at least one computer readable storage medium comprising a set of instructions for execution, etc.) or other structure capable of executing the aforementioned operations. The process 100 may be flexible in structure, and may include more than one computing device, computing system, etc. The process 100 may include circuitry to execute the aforementioned steps.

Figure 2:
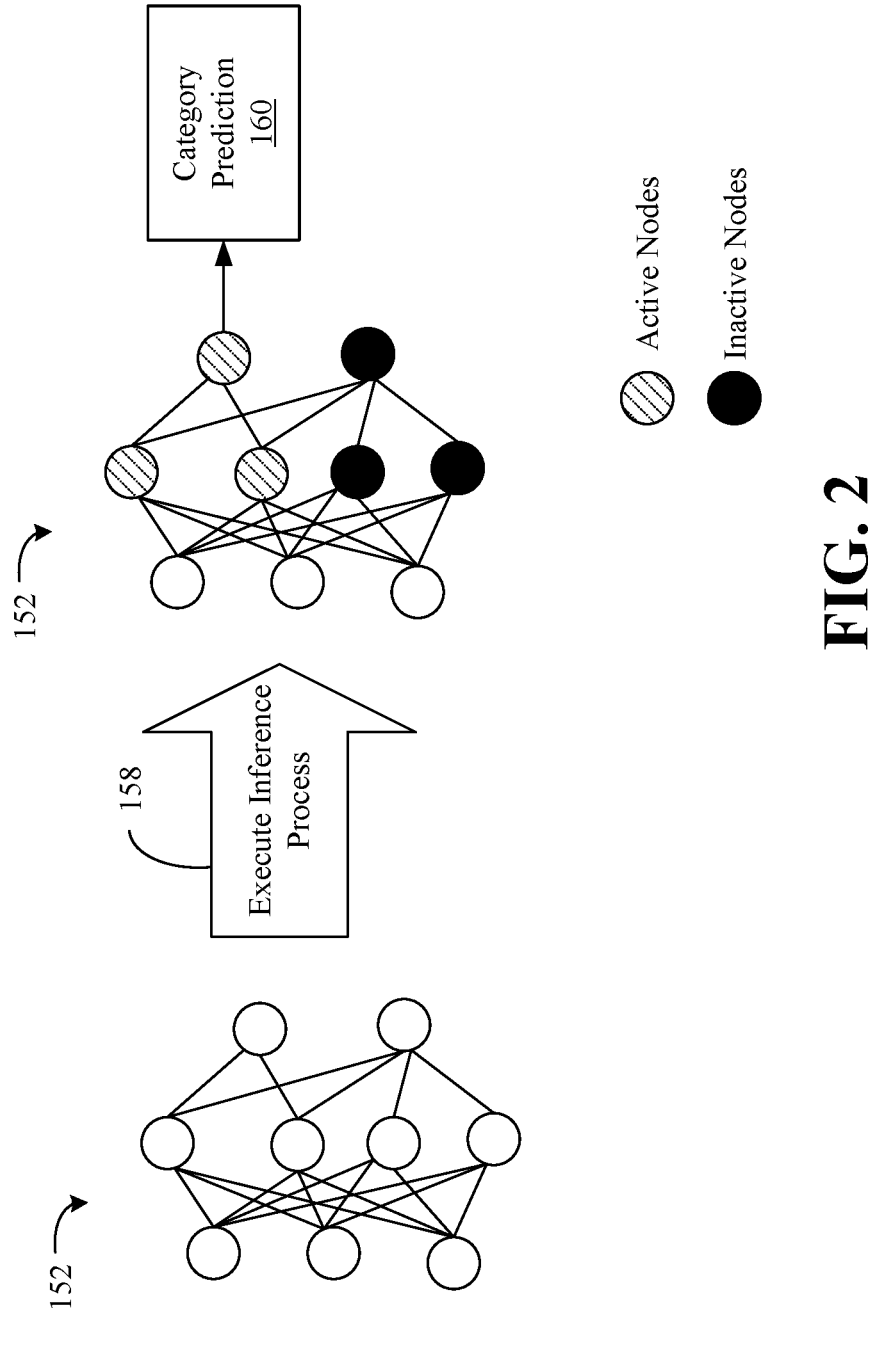
FIG. 2 is a process of an inference process according to an embodiment.

FIG. 2 illustrates an inference process 150. The inference process 150 executes with a neural network 152. The neural network 152 executes an inference process 158. The inference process 158 executes with a series of active nodes illustrated in hatch lines. The active nodes may be used for categorization. The neural network 152 includes inactive nodes that are used during training to generate latent item vectors. The latent item vectors are not needed during inference, and hence are inactivated to reduce energy and latency. The neural network 152 outputs a category prediction 160.

FIG. 3 illustrates a method 300 to generate a collaborative dataset to train a neural network in a multi-task training process. One or more aspects of method 300 may be implemented as part of and/or in conjunction with process 100 (FIG. 1) already discussed. Method 300 may be implemented in a computing device, computing system (e.g., hardware, configurable logic, fixed-function logic hardware, at least one computer readable storage medium comprising a set of instructions for execution, etc.).

Illustrated processing block 302 tracks interactions of users with items. For example, a platform may track user interactions with items. The platform may host the items on a webpage or website. Illustrated processing block 304 generates labels for a portion of the items. Only a portion of the items may be labeled as described herein for efficiency and to reduce overhead. Illustrated processing block 306 stores the items in association with the tracked interactions and the labels. For example, a first item may be stored in association with tracked interactions with the first item and labels associated with the first item.

FIG. 4 illustrates a method 320 of training a neural network in a multi-task training process. One or more aspects of method 400 mays be implemented as part of and/or in conjunction with process 100 (FIG. 1), and/or method 300 (FIG. 3) already discussed. Method 400 may be implemented in a computing device, computing system (e.g., hardware, configurable logic, fixed-function logic hardware, at least one computer readable storage medium comprising a set of instructions for execution, etc.).

Illustrated processing block 322 processes collaboration data with a neural network to generate category predictions and latent item vectors. Illustrated processing block 324 generate an interaction matrix based on the collaboration data. The interaction matrix may be a binary representation of the collaboration data. Illustrated processing block 326 applies a matrix factorization process to the interaction matrix to generate user vectors and matrix item vectors. Illustrated processing block 328 identifies labeled categories associated with the collaboration data. Illustrated processing block 330 generate a first loss based on a comparison of the latent item vectors to the collaboration item vectors, and a second loss based on the category predictions and the labeled categories. Illustrated processing block 332 trains the neural network based on first and second losses.

FIG. 5 illustrates a method 360 to generate a loss and updating a neural network based on the loss. One or more aspects of method 360 may be implemented as part of and/or in conjunction with process 100 (FIG. 1), method 300 (FIG. 3) and/or method 320 (FIG. 4) already discussed. Method 360 may be implemented in a computing device, computing system (e.g., hardware, configurable logic, fixed-function logic hardware, at least one computer readable storage medium comprising a set of instructions for execution, etc.).

Illustrated processing block 362 classifies, with a neural network, a plurality of items into classes to generate prediction categories for the items. Illustrated processing block 364 determine a number of appearances of the classes associated with the prediction categories over an entire dataset. Illustrated processing block 366 identifies a plurality of weights based on the number of appearances. Illustrated processing block 368 identifies a plurality of labeled categories associated with the items where the labeled categories are ground truths (e.g., human labeled). Illustrated processing block 370 generates a loss based on the weights, the prediction categories and the labeled categories. For example, a function may generate metrics identifying how similar the prediction categories and the labeled categories are to each other, and the metrics may be weighted based on the weights. Illustrated processing block 372 updates the neural network based on the loss.

Figures 6, 7:
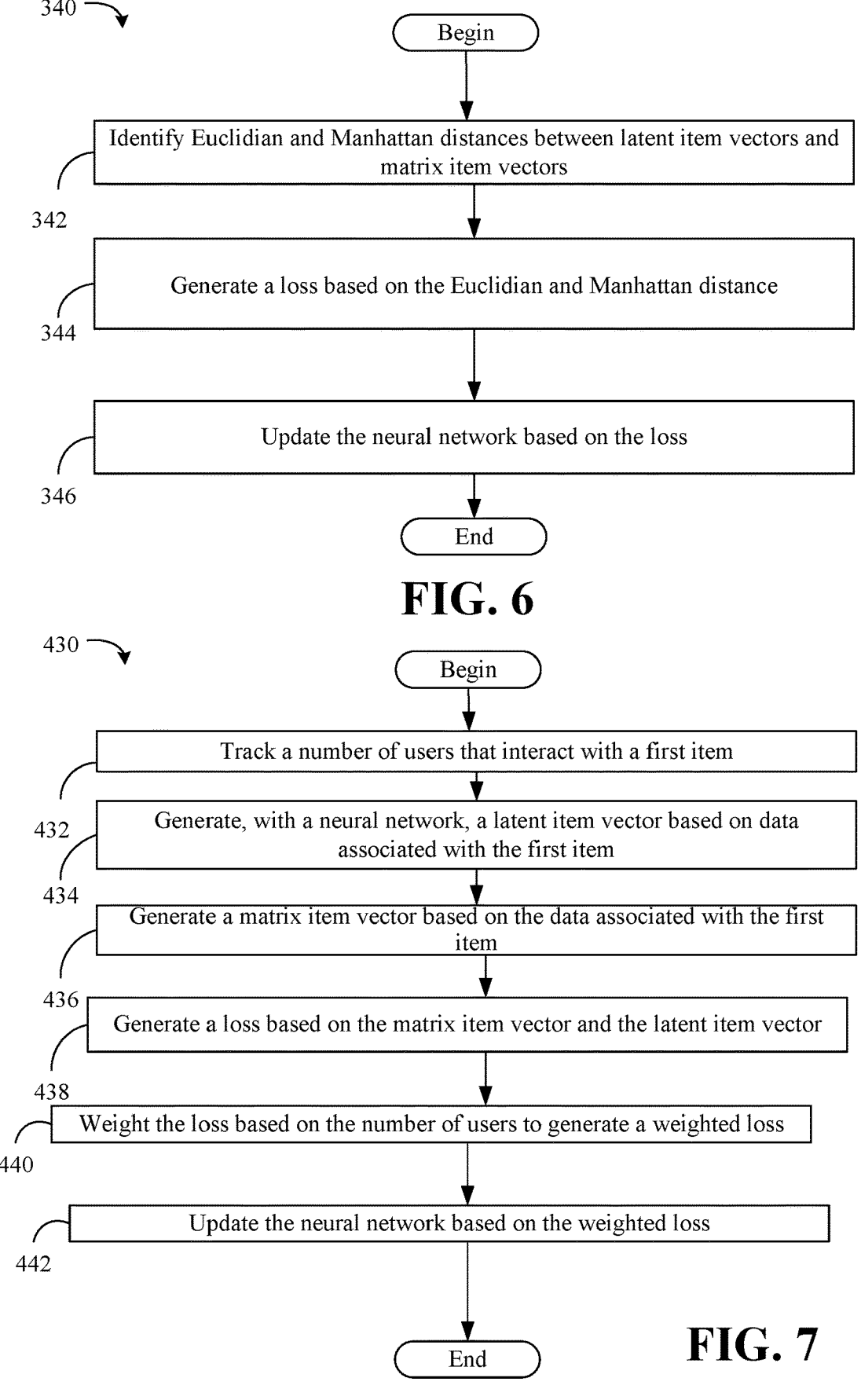
FIG. 6 is a flowchart of an example of a method of generating a loss based on distances, and updating a neural network based on the loss according to an embodiment.
FIG. 7 is a flowchart of an example of a method of generating a loss based on interaction of users, and updating a neural network based on the loss according to an embodiment.

FIG. 6 illustrates a method 340 to generate a loss. One or more aspects of method 340 may be implemented as part of and/or in conjunction with one or more aspects of process 100 (FIG. 1), method 300 (FIG. 3), method 320 (FIG. 4), and/or method 360 (FIG. 5) already discussed. Method 340 may be implemented in a computing device, computing system (e.g., hardware, configurable logic, fixed-function logic hardware, at least one computer readable storage medium comprising a set of instructions for execution, etc.).

Illustrated processing block 342 identifies Euclidian and Manhattan distances between the latent item vectors (which may be generated by a neural network) and matrix item vectors. Illustrated processing block 344 generates a loss based on the Euclidian and Manhattan distance. The loss is increased as the Euclidian and Manhattan distances increase. Illustrated processing block 346 updates the neural network based on the loss.

FIG. 7 illustrates a method 430 to weight a loss. One or more aspects of method 430 may be implemented as part of and/or in conjunction with one or more aspects of process 100 (FIG. 1), method 300 (FIG. 3), method 320 (FIG. 4), and/or method 360 (FIG. 5) already discussed. Method 430 may be implemented in a computing device, computing system (e.g., hardware, configurable logic, fixed-function logic hardware, at least one computer readable storage medium comprising a set of instructions for execution, etc.).

Illustrated processing block 432 tracks a number of users (e.g., a hosting entity may track the number of users) that interact with a first item. Illustrated processing block 434 generates, with a neural network, a latent item vector based on data associated with the first item. Illustrated processing block 436 generates a matrix item vector based on the data associated with the first item. Illustrated processing block 438 generates a loss based on the matrix item vector and the latent item vector. Illustrated processing block 440 weights the loss based on the number of users to generate a weighted loss. Illustrated processing block 442 updates the neural network based on the weighted loss.

Figure 8:
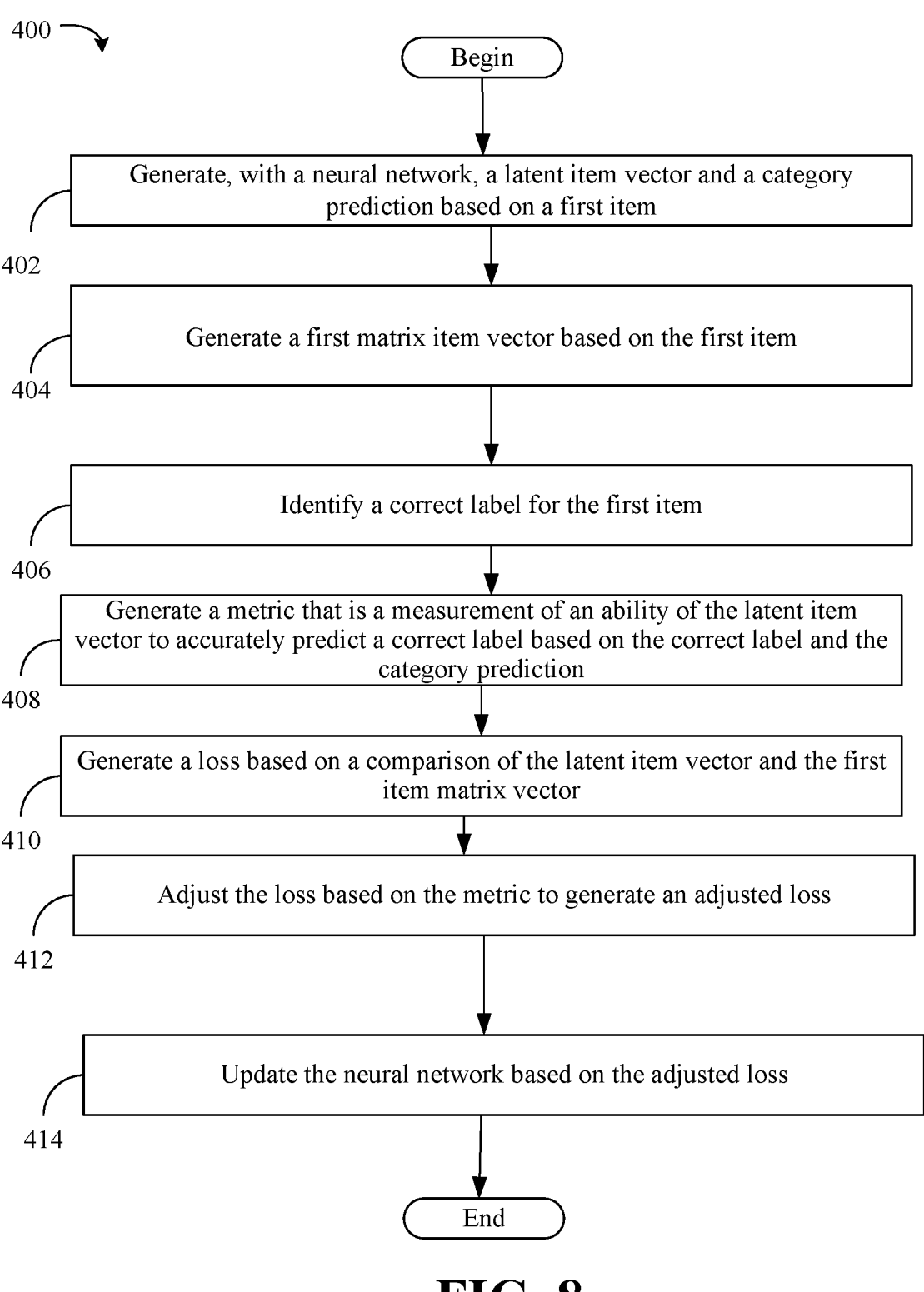
FIG. 8 is a flowchart of an example of a method of generating a loss based on an ability of a latent vector to accurately predict a correct label according to an embodiment.

FIG. 8 illustrates a method 400 to generate a loss based on an ability of a latent vector to accurately predict a correct label. One or more aspects of method 400 may be implemented as part of and/or in conjunction with one or more aspects of process 100 (FIG. 1), method 300 (FIG. 3) method 320 (FIG. 4), method 360 (FIG. 5), method 340 (FIG. 6) and/or method 430 (FIG. 7) already discussed. Method 400 may be implemented in a computing device, computing system (e.g., hardware, configurable logic, fixed-function logic hardware, at least one computer readable storage medium comprising a set of instructions for execution, etc.).

Illustrated processing block 402 generates, with a neural network, a latent item vector and a category prediction based on a first item. Illustrated processing block 404 generates a first matrix item vector based on the first item. Illustrated processing block 406 identifies a correct label for the first item. Illustrated processing block 408 generates a metric that is a measurement of an ability of the latent item vector to accurately predict a correct label based on the correct label and the category prediction. Illustrated processing block 410 generate a loss based on a comparison of the latent item vector and the first item matrix vector. Illustrated processing block 412 adjusts the loss based on the metric to generate an adjusted loss. Illustrated processing block 414 updates the neural network based on the adjusted loss.

System Overview

Figure 9:
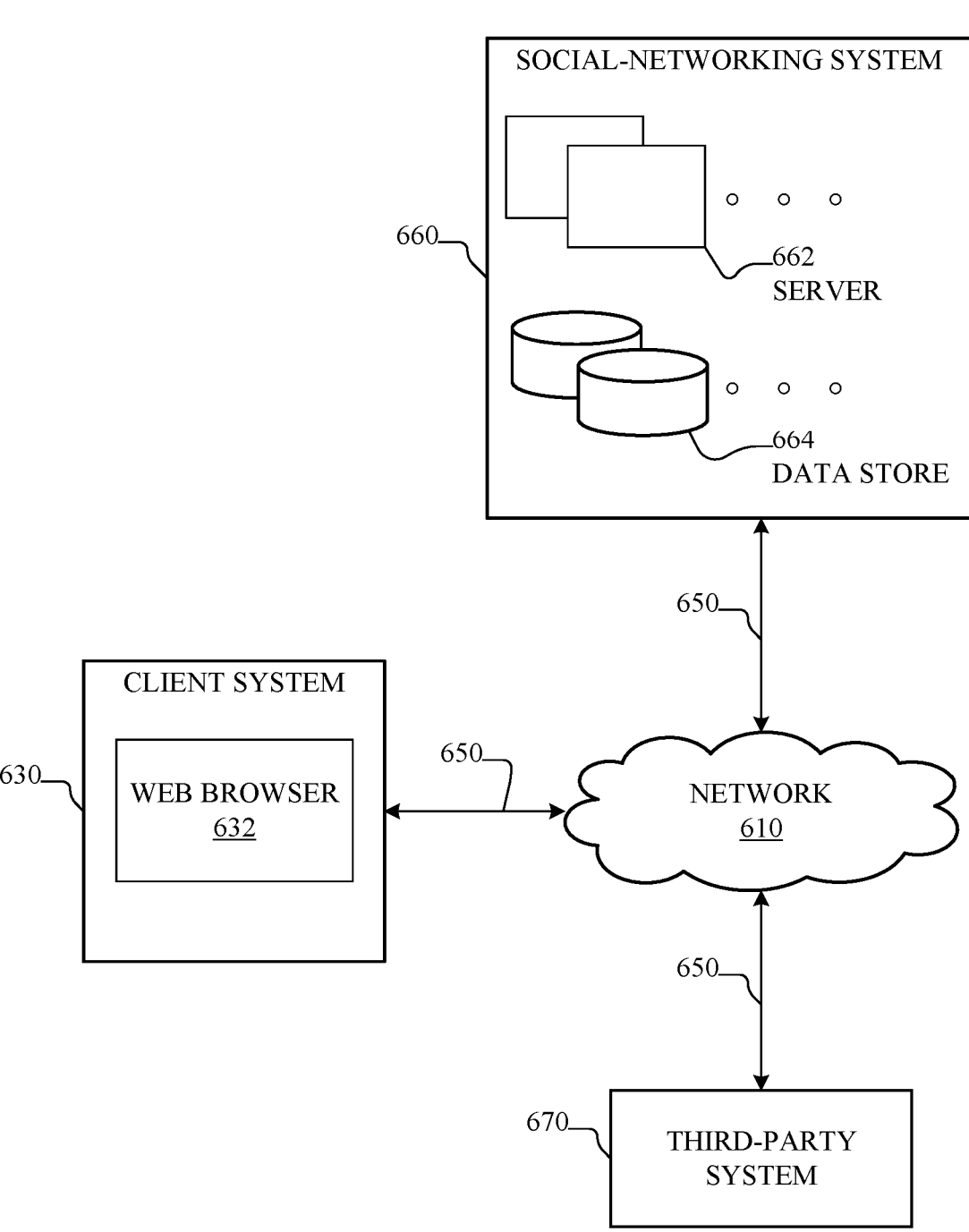
FIG. 9 illustrates an example network environment associated with a social-networking system according to an embodiment.

FIG. 9 illustrates an example network environment 600 associated with a social-networking system. Network environment 600 may implement one or more aspects of process 100 (FIG. 1), inference process 150 (FIG. 2) method 300 (FIG. 3) method 320 (FIG. 4), method 360 (FIG. 5), method 340 (FIG. 6), method 430 (FIG. 7) and/or method 400 (FIG. 8) already discussed.

Network environment 600 includes a client system 630, a social-networking system 660, and a third-party system 670 connected to each other by a network 610. Although FIG. 9 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 9 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 10:
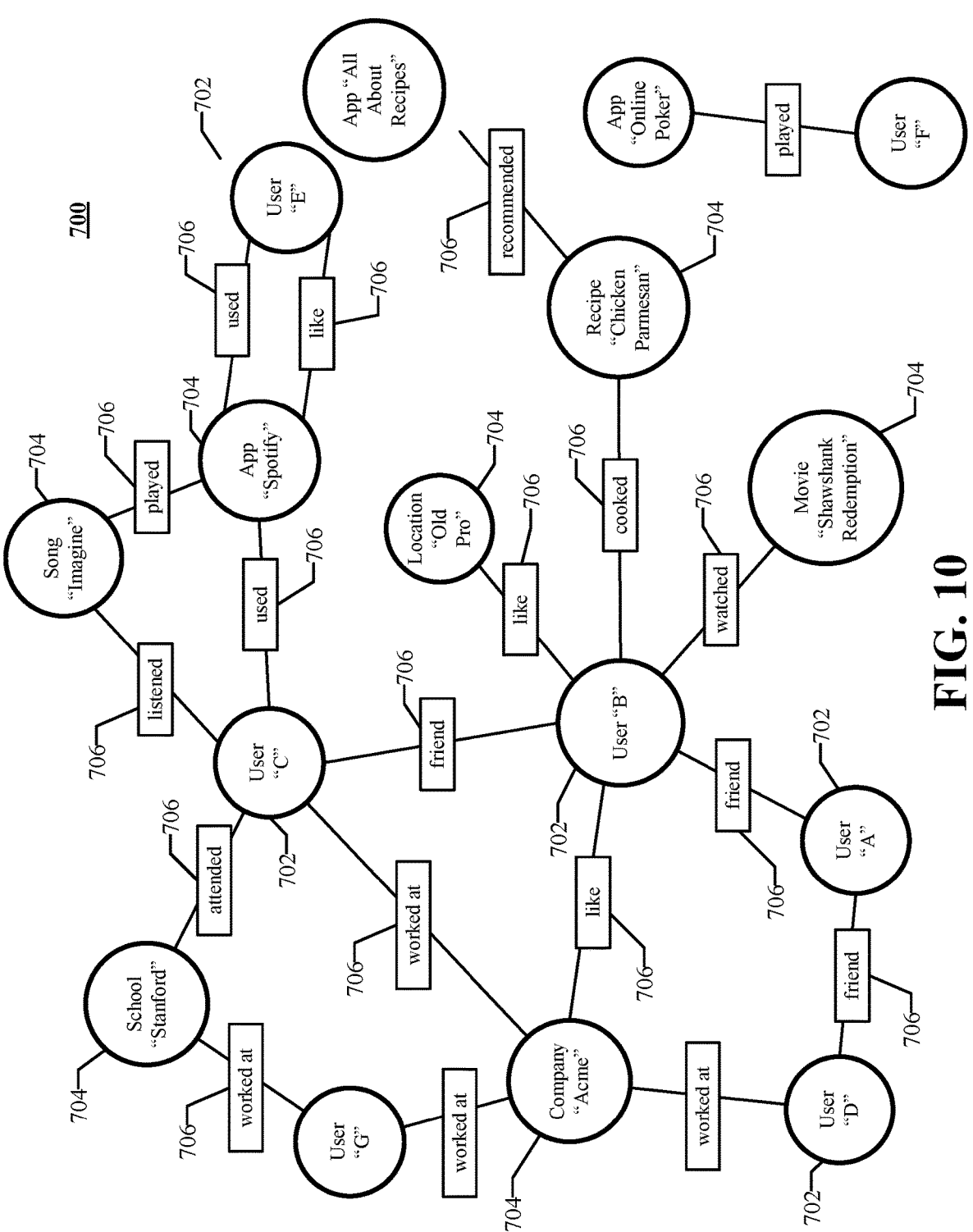
FIG. 10 illustrates an example social graph according to an embodiment.

FIG. 10 illustrates example social graph 700. In some embodiments, process 100 (FIG. 1), inference process 150 (FIG. 2) method 300 (FIG. 3) method 320 (FIG. 4), method 360 (FIG. 5), method 340 (FIG. 6), method 430 (FIG. 7) and/or method 400 (FIG. 8) already discussed may access social graph 700 to implement one or more aspects.

In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 10 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 10, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 10) between user nodes 702 corresponding to the user and concept nodes 704 corresponding to the song and application to indicate that the user listened to the song and used the application. Moreover, social-networking system 660 may create a "played" edge 706 (as illustrated in FIG. 10) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 10 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 11:
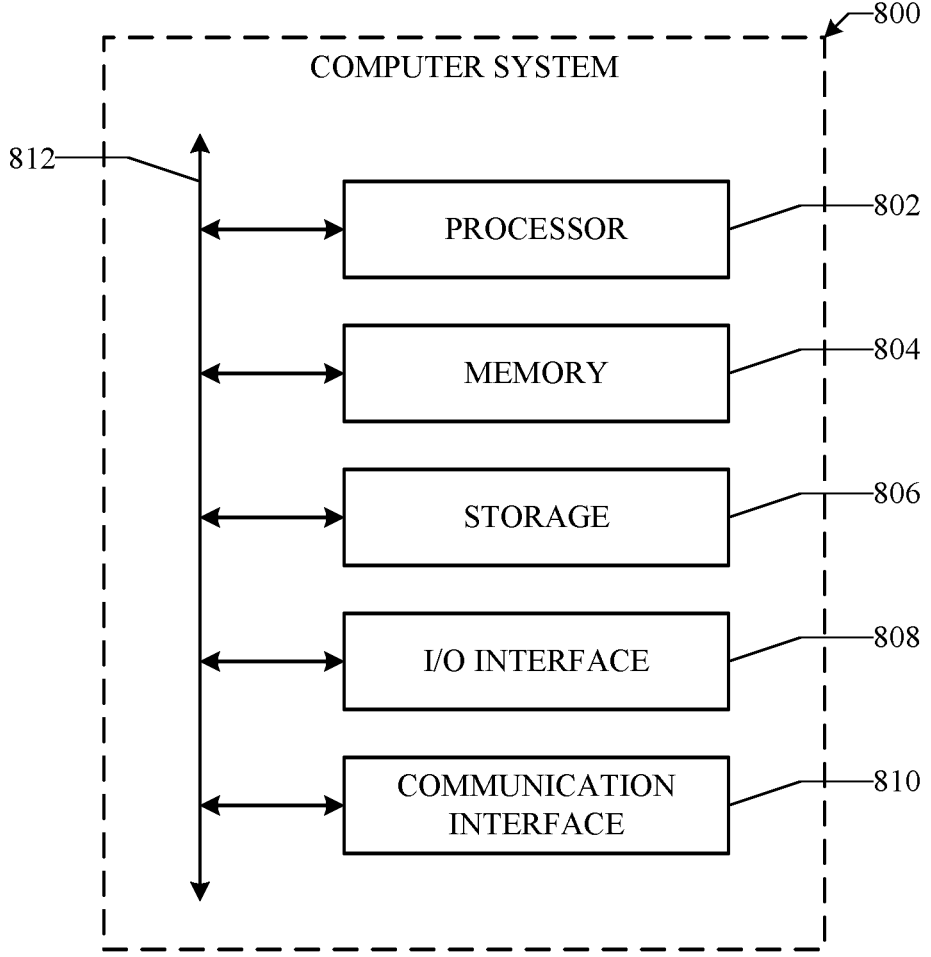
FIG. 11 illustrates an example computer system according to an embodiment.

FIG. 11 illustrates an example computer system 800. The system 800 may implement one or more aspects of process 100 (FIG. 1), inference process 150 (FIG. 2) method 300 (FIG. 3) method 320 (FIG. 4), method 360 (FIG. 5), method 340 (FIG. 6), method 430 (FIG. 7) and/or method 400 (FIG. 8) already discussed. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Thus, technology described herein may support a granular image enhancement selection process. The technology may substantially reduce the memory needed to store listings, the time needed to consummate a transaction and preserve valuable compute resources as well as bandwidth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one non-transitory computer readable storage medium comprising a set of instructions, which when executed by a computing device, cause the computing device to:

generate an interaction matrix from collaboration data, wherein the collaboration data represents user interactions with a plurality of items;

apply, prior to a multi-task training process with a neural network, a matrix factorization process to the interaction matrix to generate user vectors and matrix item vectors; and execute the multi-task training process with the neural network, wherein the multi-task training process includes:

processing the collaboration data with the neural network to generate latent item vectors, identifying distances between the latent item vectors and the matrix item vectors;

generating a first loss based on the distances; and training the neural network based on the first loss.

2. The at least one non-transitory computer readable storage medium of claim 1, wherein the multi-task training process includes:

classifying, with the neural network, the plurality of items into classes to generate prediction categories for the plurality of items.

3. The at least one non-transitory computer readable storage medium of claim 2, wherein the instructions, when executed, cause the computing device to:

determine a number of appearances of the classes associated with the prediction categories;

identify a plurality of weights based on the number of appearances;

identify a plurality of labeled categories associated with the items;

generate a second loss based on the weights, the prediction categories and the labeled categories; and update the neural network based on the second loss.

4. The at least one non-transitory computer readable storage medium of claim 1, wherein the comparison of the latent item vectors to the matrix item vectors includes:

generating the loss based on a first matrix item vector of the matrix item vectors and a first latent item vector of the latent item vectors, wherein the first matrix item vector and the first latent item vector are associated with a first item of the plurality of items; and weighting the first loss based on a number of users that are associated with the first item.

5. The at least one non-transitory computer readable storage medium of claim 1, wherein the comparison of the latent item vectors to the matrix item vectors includes:

generating the first loss based on a first latent item vector of the latent item vectors and a first matrix item vector of the matrix item vectors;

generating a metric that is a measurement of an ability of the first latent item vector to accurately predict a correct label;

adjusting the first loss based on the metric; and updating the neural network based on the first loss.

6. The at least one non-transitory computer readable storage medium of claim 5, wherein the metric is a mean reciprocal loss value calculated based on a predicted label and the correct label, wherein the predicted label is associated with the first matrix item vector and is generated by the neural network.

7. A system comprising:

one or more processors; and a memory coupled to the one or more processors, the memory comprising instructions executable by the one or more processors, the one or more processors being operable when executing the instructions to:

generate an interaction matrix from collaboration data, wherein the collaboration data represents user interactions with a plurality of items;

apply, prior to a multi-task training process with a neural network, a matrix factorization process to the interaction matrix to generate user vectors and matrix item vectors; and execute a multi-task training process with the neural network, wherein the multi-task training process includes:

processing the collaboration data with the neural network to generate latent item vectors, identifying distances between the latent item vectors and the matrix item vectors;

generating a first loss based on the distances; and training the neural network based on the first loss.

8. The system of claim 7, wherein the multi-task training process includes:

classifying, with the neural network, the plurality of items into classes to generate prediction categories for the plurality of items.

9. The system of claim 8, wherein the one or more processors are further operable when executing the instructions to:

determine a number of appearances of the classes associated with the prediction categories;

identify a plurality of weights based on the number of appearances; identify a plurality of labeled categories associated with the items;

generate a second loss based on the weights, the prediction categories and the labeled categories; and update the neural network based on the second loss.

10. The system of claim 7, wherein the comparison of the latent item vectors to the matrix item vectors includes:

generating a first loss based on a first matrix item vector of the matrix item vectors and a first latent item vector of the latent item vectors, wherein the first matrix item vector and the first latent item vector are associated with a first item of the plurality of items; and weighting the first loss based on a number of users that are associated with the first item.

11. The system of claim 7, wherein the comparison of the latent item vectors to the matrix item vectors includes:

generating a first loss based on a first latent item vector of the latent item vectors and a first matrix item vector of the matrix item vectors;

generating a metric that is a measurement of an ability of the first latent item vector to accurately predict a correct label;

adjusting the first loss based on the metric; and updating the neural network based on the loss.

12. The system of claim 11, wherein the metric is a mean reciprocal loss value calculated based on a predicted label and the correct label, wherein the predicted label is associated with the first matrix item vector and is generated by the neural network.

13. A method comprising:

generating an interaction matrix from collaboration data, wherein the collaboration data represents user interactions with a plurality of items;

applying, prior to a multi-task training process with a neural network, a matrix factorization process to the interaction matrix to generate user vectors and matrix item vectors; and executing a multi-task training process with a neural network, wherein the multi-task training process includes:

processing the collaboration data with the neural network to generate latent item vectors, identifying distances between the latent item vectors and the matrix item vectors;

generating a first loss based on the distances; and training the neural network based on the first loss.

14. The method of claim 13, wherein the multi-task training process includes:

classifying, with the neural network, the plurality of items into classes to generate prediction categories for the plurality of items.

15. The method of claim 14, further comprising:

determining a number of appearances of the classes associated with the prediction categories;

identifying a plurality of weights based on the number of appearances;

identifying a plurality of labeled categories associated with the items;

generating a second loss based on the weights, the prediction categories and the labeled categories; and updating the neural network based on the second loss.

16. The method of claim 13, wherein the comparison of the latent item vectors to the matrix item vectors includes:

generating the first loss based on a first matrix item vector of the matrix item vectors and a first latent item vector of the latent item vectors, wherein the first matrix item vector and the first latent item vector are associated with a first item of the plurality of items; and weighting the first loss based on a number of users that are associated with the first item.

17. The method of claim 13, wherein the comparison of the latent item vectors to the matrix item vectors includes:

generating a first loss based on a first latent item vector of the latent item vectors and a first matrix item vector of the matrix item vectors;

predicting, with the neural network, a predicted label associated with the first matrix item vector;

generating a metric that is a measurement of an ability of the first latent item vector to accurately predict a correct label, wherein the metric is a mean reciprocal loss value calculated based on the predicted label and the correct label;

adjusting the first loss based on the metric; and updating the neural network based on the first loss.

* * * * *